B. MARLAND.
CASING SALTING AND SKEINING MACHINE OR THE LIKE.
APPLICATION FILED APR. 8, 1916.
1,248,521. Patented Dec. 4, 1917.
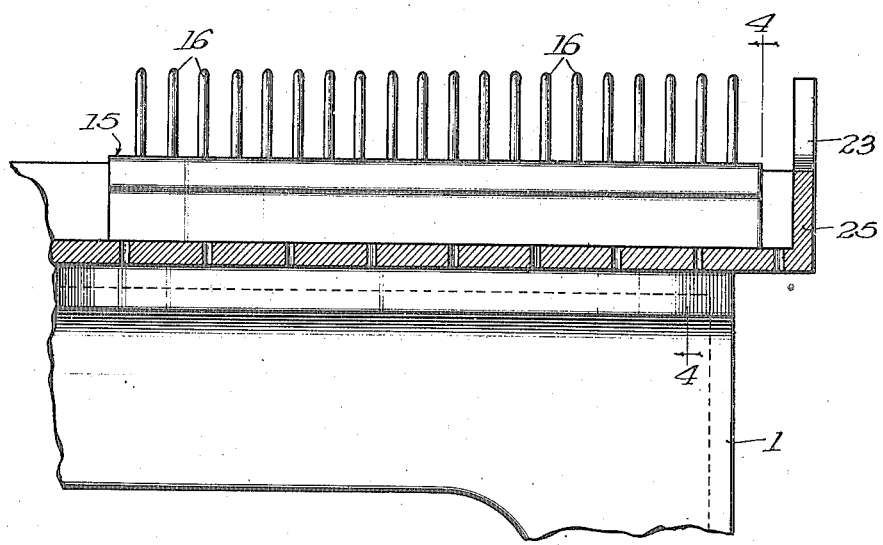
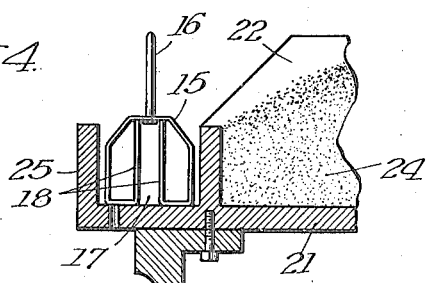
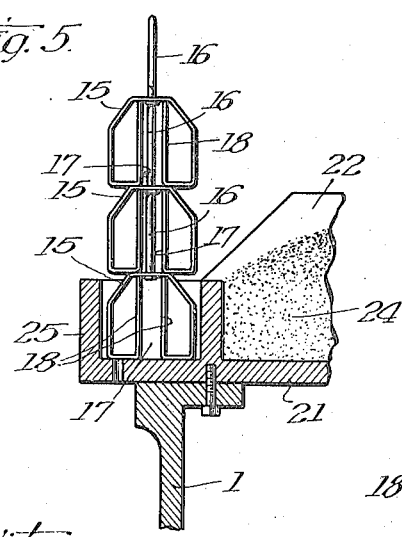
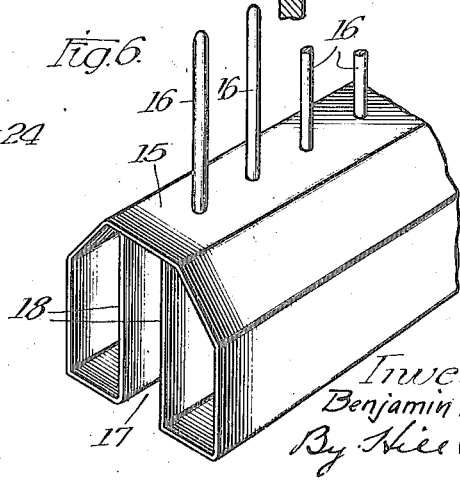

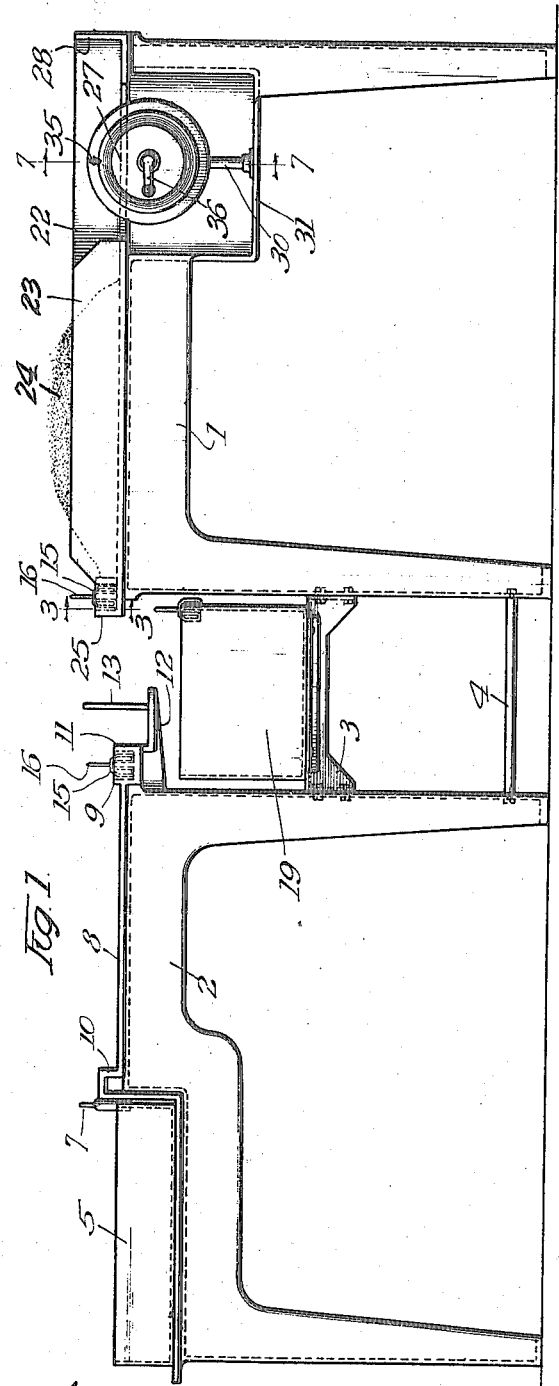
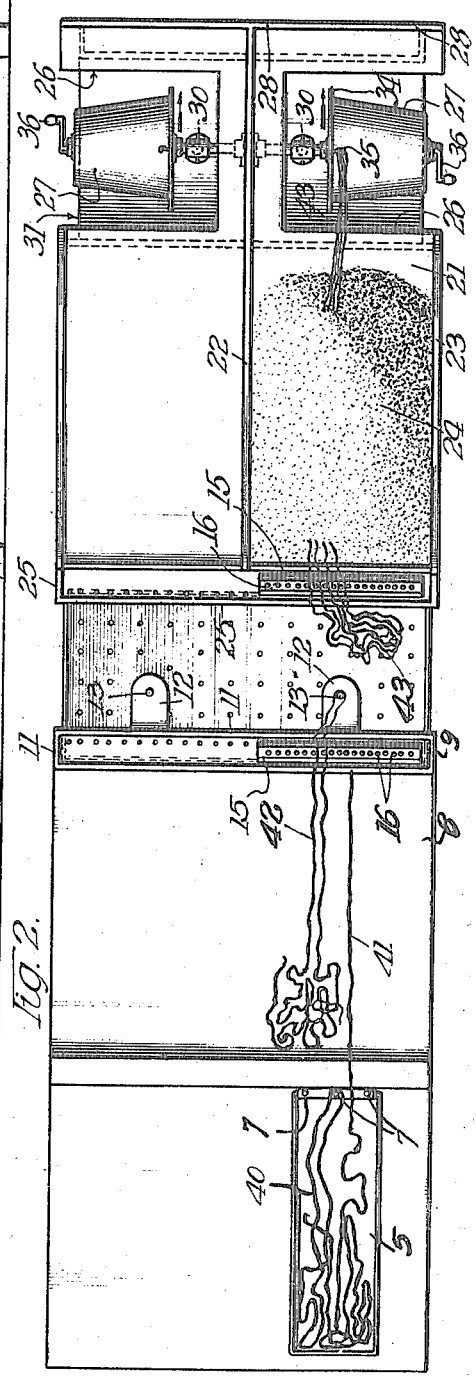

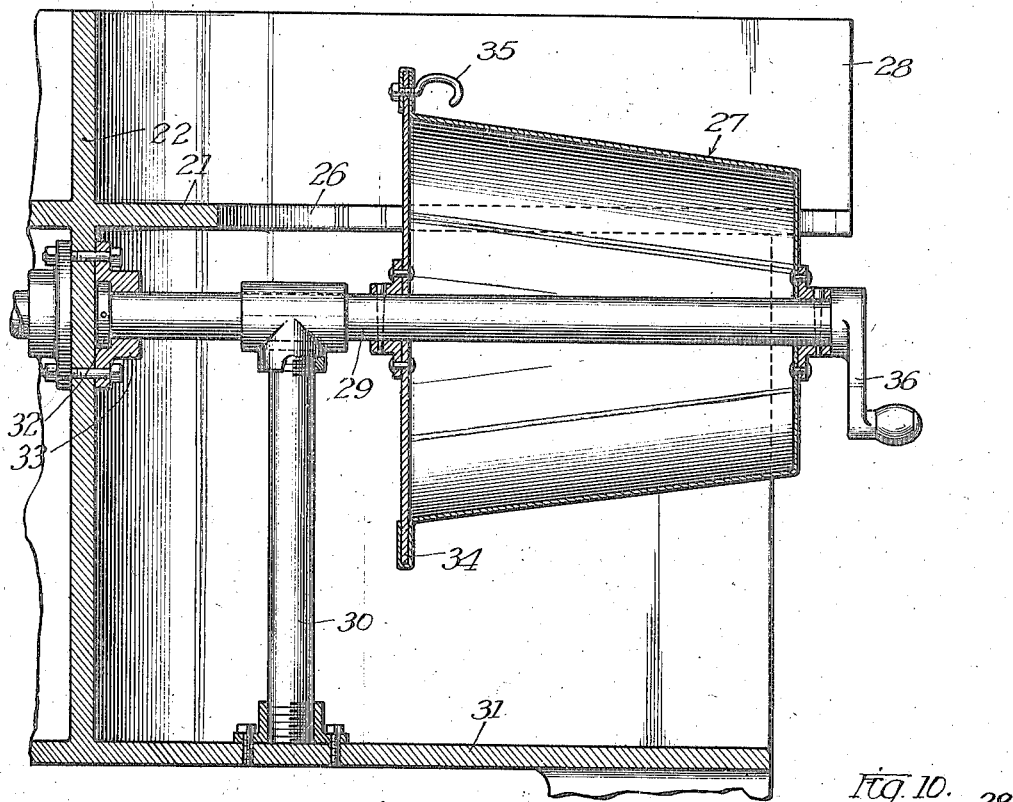

UNITED STATES PATENT OFFICE.

BENJAMIN MARLAND, OF CHICAGO, ILLINOIS.

CASING SALTING AND SKEINING MACHINE OR THE LIKE.

1,248,521.      Specification of Letters Patent.      Patented Dec. 4, 1917.

Application filed April 8, 1916. Serial No. 89,870.

*To all whom it may concern:*

Be it known that I, BENJAMIN MARLAND, a citizen of the United States, residing at Chicago, in the county of Cook and State of Illinois, have invented certain new and useful Improvements in Casing Salting and Skeining Machines or the like, of which the following is a description.

My invention belongs to that general class of devices known as salting and skeining machines, and particularly a machine for salting and skeining sausage casings known as animal intestines, together with the method of salting the same. My invention has among its objects an improved method and mechanism for salting and skeining animal intestines for sausage casings, that is simple, efficient, durable, and satisfactory, and which may be used wherever found applicable. It particularly has as an object the production of an improved machine that will thoroughly salt the intestines, with a minimum of labor and time, and produce in all respects a superior article. Other objects and advantages of the method and mechanism herein described will be obvious to those skilled in the art to which the invention appertains.

To this end my invention consists in the novel construction, arrangement and combination of parts herein shown and described, and more particularly pointed out in the claims.

In the drawings, wherein like reference characters indicate like or corresponding parts, Figure 1 is a side elevation of one type of machine;

Fig. 2 is a top elevation of the same;

Fig. 3 is a sectional view taken substantially on line 3—3 of Fig. 1;

Fig. 4 is a sectional view taken substantially on line 4—4 of Fig. 3;

Fig. 5 is a view similar to Fig. 4, showing several combs nested, and applicable for use;

Fig. 6 is a perspective view of a portion of one of my preferred forms of separator;

Fig. 7 is a sectional view taken substantially on line 7—7 of Fig. 1;

Fig. 8 is a detailed view of one of the combs, illustrating a step in the arranging of the casings on the comb;

Fig. 9 is a similar view, showing the looped ends of the casings positioned on one of the pins of the comb, the comb then being ready to be lifted to proper place on the salt side of the machine or where desired;

Fig. 10 is a top elevation of a portion of the machine, showing the first step in drawing the casings through the salt;

Fig. 11 is a top elevation of a portion of the table, showing the salted casing coiled and ready to be skeined;

Fig. 12 is a sectional view through the salt bed and several casings;

Fig. 13 is a view of the casings withdrawn from the coiling drum;

Fig. 14 shows a step in the skeining, and

Fig. 15 illustrates the section of casings ready to be packed for shipment or storage.

Heretofore it has been usual or customary for the operator to coil the casings over a pair of pegs, and then rubbing the salt on the casings skein, so as to salt the casings, the same being more or less bunched together, and the salt generally rubbed in transversely across the casings, frequently and generally tangling them as well as disarranging the skein. My improved method consists in combing or separating the casings, after the same have been washed, prepared and gaged, etc., and drawing the same lengthwise through the salt, if desired placing pressure on the salt pile or rubbing the salt in by movement of the hands, or the equivalent, thereby thoroughly salting each individual strand, making a thorough cure. At the same time the casings are coiled or skeined in such shape as to facilitate or permit final tying in the skeining. Each skein is of a uniform length and size and entirely free from tangles or disarrangement. The skeins are also in such shape and condition that the work of the sausage maker in stripping each strand is greatly facilitated, and there is less chance for the casings to become tangled or knotted in the stripping and stuffing. With my improved machine the sorted or sized and prepared casings are brought to the machine, where they may be easily measured and arranged so that they may be carried about or taken substantially intermediate their ends and handled in a most efficient manner. The looped ends are then engaged and the casings drawn through the salt or curing bath, the casings being separated and thoroughly cured, and at the same time coiled or skeined.

Referring to the drawings, in which one form of my machine is shown, 1 represents what may be termed the salting and skeining table, and 2 the receiving and measuring table, the two being shown suitably associated together for convenient operation. It may be mentioned that the tables shown are double, that is arranged for workers on each side, but single tables may be employed where desired. I have shown cross-bars 3 and bolts 4 for connecting the two tables and maintaining them in relation to each other. It may be mentioned that the casings are animal intestines, usually from hogs, sheep or cattle, which are suitably washed, prepared, gaged for diameter, and otherwise treated, as may be desired, and the same brought to the machine herein described in the pans or receptacles 5, shown in Figs. 1 and 2. The receptacle shown is provided with one or more pins 7, over which the gaged intestine casings are looped, the pins where several are employed, representing the different lengths which are arranged on the different pegs. The casings are then suitably measured and arranged in a convenient manner for handling, as will be hereafter described, and are then salted and finally formed into skeins, as shown in Fig. 14, and suitably packed for shipping or storage.

The receiving and measuring table is provided with a top 8, and in the construction shown with stops 9 and 10 the desired distance apart, the stops forming a convenient measure for measuring the length of the casings. Any suitable apparatus may be provided for recording or indicating the total lengths measured, it not being considered necessary to illustrate herein any measuring device. The table top 2 is provided with an extension 11, arranged to carry suitable separating or combing members, hereafter described, and with an extension 12 carrying a post or pin 13.

The separating or combing members are most clearly shown in Figs. 3 to 6 inclusive. As shown, the body 15 of the comb is preferably made of sheet metal, and carries the desired number of pins or posts 16, arranged from end to end. The same are each also preferably provided with an opening or groove 17 in the under side. In the sheet metal construction shown this is conveniently formed by turning up the edges 18, forming a very efficient reinforcement for the members. By forming the combs or separators as shown, they may be stacked as shown in Fig. 5, the stacks being particularly self-supporting, or arranged on the edges of receptacle 19.

Arranged between the two tables 1 and 2 is a tank or receptacle 19, which may have a perforated bottom so as to permit the escape of any drippings from the casings. The purpose of the receptacle is to keep the extending ends from the casings from dragging on the floor and becoming dirty, as well as tangling or snarling.

The salting and skeining table 1 consists of a table top 21, having walls 22 and 23, between which is arranged the salt bath 24. At the end of the table, adjacent receptacle 19, is an extension 25 arranged to carry one or more comb or separating members 15 (see Fig. 5). A portion of the table is cut away at 26, and at the opening is arranged a drum 27, or the equivalent. The table is also shown with a wall or ledge 28 about the outer end. The drum 27 is carried by a shaft 29, the outer end of the drum being free and arranged so that a coil of casings may be wound on the drum and be slipped off over the end. In addition to facilitate the slipping off of the casings the drum is shown tapered toward the outer end. The shaft 29 is shown supported by the standard 30, carried by the part 31 of the table, any longitudinal movement of the shaft being prevented by a collar 32 engaging part 33, or with equivalent means for the purpose. The drum is provided with a flange 34, and also with a hook 35, the drum being rotatable by means of the crank handle 36, or the equivalent for the purpose.

In describing the method of salting and skeining the casings and the mechanism for doing it, reference should be made to Figs. 2 and 8 to 14 inclusive. Referring first to Fig. 2, a casing 40 is shown in the receptacle 5, the same being positioned over one of the pegs 7. A second casing 41 is shown partially withdrawn from the receptacle, and the first step in measuring the same between the stops 9 and 10. Successive pulling of the casing from the pan 5, and extending the same between the stops, gives the total length of the casing. The same is then looped over the peg or post 13, with the free ends extending in the spaces between the pins 16. A casing 42 is shown positioned as described. When the desired number of casings are arranged over the peg, extending between the different pins, as most clearly shown in Fig. 8, the looped ends are slipped from the peg or post 13 and looped over one of the pins 16, as shown in Fig. 9. The separator or comb is then lifted from its support and positioned on the support 25 carried by the salting table, with the free ends of the casings carried in or supported by the receptacle 19. If desired, combs may also be arranged about the receptacle, as indicated in Fig. 1. Assume, however, that the comb is arranged in the extension 25, as shown in Figs. 2 and 10: In Fig. 2 only one casing is illustrated, while in Fig. 10 several are shown. When the comb is placed on the extension the ends are looped, as indicated in dotted lines in Fig. 2. The salting operator then grasps the looped ends of the casing and draws them through the salt lengthwise the casing 1, carefully salting the loops, and draws the casings to a point where they may be hooked or engaged with the hook 35. As the crank 36 is turned the casings are wound on the drum 27, as indicated in Fig. 11. They are pulled lengthwise through the salt, and the comb or separator causing them to be separated, for example as shown in Figs. 10 and 12, so that each and every casing is thoroughly and completely salted at every point. As soon as the same has been wound on the drum, as indicated in Fig. 11, the looped ends may be unhooked and the skein or coil slipped from the drum, the same then being substantially as indicated in Fig. 13. The operator then weaves the looped end 45 around substantially as indicated in the full and dotted lines in Fig. 14, extending the free end 45 through the final loop, as shown in Fig. 15, so that the skein is complete, and thoroughly salted, may be placed in the containers, or otherwise stored or shipped.

By handling the casings as herein described, they are at all times handled in such a way that they do not tangle or become snarled, and they may be easily and conveniently transferred from the measuring to the salting table. They may then be taken in proper order and passed through the salt, efficiently and completely salting the same, after which they are coiled in a simple manner so as to facilitate the skeining. By looping and skeining the casings, as heretofore described, it is a simple matter to open and strip the skeins, if desired, or that is when the sausage manufacturer desires to use the same. There is practically no chance for a tangle from the time they are taken from the tank 5 until they are completely skeined, as shown in Fig. 15, and there is but slight chance, if any, for tangling the skeins or strands from the time they are packed until they are stripped and filled by the sausage manufacturer. It is of importance that the skeins be so formed that they may be handled by the sausage manufacturer in the most efficient manner. The efficient and thorough salting has been emphatically mentioned because, owing to their nature, if the casings are not thoroughly salted at all points, decomposition sets in, causing holes in the casings, thereby rendering them of less value, or the casings, owing to the decomposition, may be so weakened that when stuffing they will fracture, causing trouble at that time. The saving in time over the present crude methods, merely placing the casings in the salt and rubbing them, ordinarily in all sorts of ways, tangling them, etc., is considerable, as less labor is required, or greater output of the same labor may be obtained. Inasmuch as the skeins are formed in a practical, simple and satisfactory manner, and so that they may be stripped without tangling or knotting, the labor and troubles of the sausage manufacturer are reduced. The sausage manufacturer has the advantage of a better cured casing, as well as one that is more easily handled by him. While I have particularly alluded to the use of salt for curing casings, it is, of course, obvious that any equivalent for the salt that will be satisfactory for the purpose may be used, and if desired, other preservatives may be combined with the salt. As previously mentioned, the casings may be gaged and otherwise treated before placing in the pans 5, but I have not considered it necessary to illustrate or describe in full how the casings are previously treated, nor do I wish to be confined to any particular kind, grade or size of casings.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:—

1. In a casing salting machine of the kind described and in combination, a salt container, means for engaging the casings intertermediate their ends, and drawing the ends of the casings lengthwise therethrough, and means for separating and maintaining the ends of the casings separated during their passage through the salt.

2. In a casing salting machine of the kind described and in combination, a salt container, means for engaging and drawing the casings lengthwise therethrough, and skeining the same, and means for maintaining the casings separated during their passing through the salt.

3. In a device of the kind described and in combination, a suitable salt cantainer, a comb member carried at one side thereof, and a drum arranged at the other side thereof, said drum supported from one end thereof, and means for rotating the said drum as desired.

4. In a device of the kind described and in combination, a suitable salt container, a comb member removably carried at one side thereof, and a drum arranged at the other side thereof, said drum supported from one end thereof and provided with casing engaging means, and means for rotating the said drum as desired.

5. In a device of the kind described and in combination, a casing receptacle, a salt container, a comb removably carried at one side thereof, and a drum arranged on the other side of said container, said drum provided with a support therefor extending from one end thereof, and means for rotating the said drum.

6. In a device of the kind described for treating animal intestines for sausage casings and in combination, a pair of associated tables arranged end to end and spaced from each other, a pan-shaped receptacle arranged between said tables, a comb member having a series of teeth, means on each table for supporting said comb on either table as desired, and a drum on one table at the outer end thereof with its axis of rotation extending transversely the table.

7. In a device of the kind described for treating animal intestines for sausage casings and in combination, a pair of associated tables arranged end to end and spaced from each other, a pan-shaped receptacle arranged in the space between said tables, a comb member comprising a body part having a series of pins projecting therefrom, means on each table adjacent the meeting ends for removably supporting the said comb from either table as desired, one table having a bracket extending therefrom between the tables, provided with a vertically extending post, the other table provided with a rotatable skeining drum arranged adjacent the other end thereof, with its axis of rotation extending transversely the table.

8. In a device of the kind described for treating animal intestines for sausage casings and in combination, a pair of associated tables arranged end to end and spaced from each other, a pan-shaped receptacle arranged in the space between said tables, a comb member comprising a body part having a series of pins projecting therefrom, means on each table adjacent the meeting ends for removably supporting the said comb from either table as desired, one table having a bracket extending therefrom between the tables, provided with a vertically extending post, the other table provided with a rotatable skeining drum arranged adjacent the other end thereof, with its axis of rotation extending transversely the table, said drum tapered from the rear end toward the front end, and provided with a casing engaging member at the enlarged end, means for supporting the rear end of said drum, and means for rotating the drum as desired.

9. In a curing machine of the kind described and in combination, a casing combing member comprising a body part having a series of pins projecting from the top face thereof, and provided with a groove on the under side, of a size sufficient to receive a portion of the pins of a substantially similar comb, whereby the combs may be stacked one above the other.

10. In a salting machine of the kind described and in combination, a tapered rotatable drum, means extending from the enlarged end of said drum for supporting the same, means arranged at the peripheral face of said drum, adjacent the enlarged end, for engaging a plurality of sausage casings, and means arranged at the small end of said drum for rotating the same as desired.

11. In a salting machine of the kind described and in combination, a salt container, a tapered rotatable drum, means extending from the enlarged end of said drum for supporting the same, means arranged at the peripheral face of said drum, adjacent the enlarged end, for engaging a plurality of sausage casings, intermediate their ends, and means arranged at the small end of said drum for rotating the same as desired.

12. In a casing salting device of the kind described and in combination, a suitable salt container, means for detachably engaging a plurality of casings intermediate their ends and drawing the same lengthwise through the salt, and means for separating the free ends of the several casings before passing through the salt, whereby they are substantially maintained separated while in the salt bath.

13. A method of salting animal intestines for sausage casings, consisting in drawing the casings lengthwise through a salt bath, at the same time maintaining the casings separated from each other.

14. A method of salting animal intestines for sausage casings, consisting in drawing the casings lengthwise through a salt bath, and coiling the same, at the same time maintaining the casings separated from each other while passing through the salt.

15. A method of curing animal intestines for sausage casings, consisting in looping the individual casings between the ends thereof, and then drawing the same lengthwise through the preservative bath, advancing the looped ends first.

16. A method of salting intestine sausage casings, consisting in looping the same between the ends and arranging the looped ends together, then drawing the same lengthwise through a salt bath, and at the same time combing the casings to separate the same in the salt.

17. A method of curing intestine sausage casings, consisting in looping the same between the ends and arranging the looped ends together, then drawing the same lengthwise through a curing bath and coiling the same, and at the same time combing the casings to separate the same in the bath.

18. A method of salting intestine sausage casings, consisting in looping the individual casings between the ends, thence separating the free ends and drawing the same, the looped ends first, lengthwise through a salt bath, whereby each casing is thoroughly individually salted.

19. A method of preparing intestine sausage casings, consisting in looping the intestine between the ends and arranging all of the looped ends together, then drawing the casings lengthwise through a preserving bath, and at the same time combing the casings to separate the same in the bath, thence coiling the casings and weaving the looped ends to form a completed skein, thereby maintaining the parts of the coil together.

In testimony whereof, I have hereunto signed my name in the presence of two subscribing witnesses.

BENJAMIN MARLAND.

Witnesses:
   Roy W. Hill,
   Charles I. Cobb.